US010118438B2

(12) United States Patent
Wegrzyn

(10) Patent No.: US 10,118,438 B2
(45) Date of Patent: *Nov. 6, 2018

(54) WALL MOUNTED, THREE DIMENSIONAL, VISUAL DISPLAY ELEMENT

(71) Applicant: 3D LIGHTING FX INC., Mississauga (CA)

(72) Inventor: Tom P. Wegrzyn, Mississauga (CA)

(73) Assignee: 3D LIGHTING FX INC., Mississauga (CA)

( * ) Notice: Subject to any disclaimer, the term of this patent is extended or adjusted under 35 U.S.C. 154(b) by 101 days.

This patent is subject to a terminal disclaimer.

(21) Appl. No.: 15/231,625

(22) Filed: Aug. 8, 2016

(65) Prior Publication Data
US 2017/0057278 A1    Mar. 2, 2017

Related U.S. Application Data

(63) Continuation of application No. 13/878,147, filed as application No. PCT/CA2011/001139 on Oct. 7, 2011, now Pat. No. 9,409,439.
(Continued)

(51) Int. Cl.
*F21V 21/02* (2006.01)
*B44C 5/04* (2006.01)
(Continued)

(52) U.S. Cl.
CPC ............ *B44C 5/0461* (2013.01); *A47B 81/06* (2013.01); *A47B 96/027* (2013.01); *A47G 29/00* (2013.01);
(Continued)

(58) Field of Classification Search
CPC .. F21S 8/033; F21S 9/02; F21V 21/02; F21V 21/0808; A63H 37/00
(Continued)

(56) References Cited

U.S. PATENT DOCUMENTS 1,956,150 A * 4/1934 Feo ........................... B44C 1/28
427/202
2,839,670 A * 6/1958 Gladstone .............. H01H 9/161
174/66
(Continued)

FOREIGN PATENT DOCUMENTS

CN       2058147 U     6/1990
FR       2881681       8/2006
(Continued)

OTHER PUBLICATIONS

Office Action for Russian Patent Application No. 2013120541; 1 page; dated Mar. 30, 2015.
(Continued)

*Primary Examiner* — Ismael Negron
(74) *Attorney, Agent, or Firm* — Snell & Wilmer LLP

(57) ABSTRACT

A three dimensional visual element includes a decal or other device to simulate a crack or break within the wall on which the visual elements is mounted. The visual element also includes a functional feature, such as a light, shelf support electronic device, or the like, so that the visual element also provides some utility. In one example, a three dimensional representation of a soccer ball is provided wherein the soccer ball is surrounded by a clear plastic decal having a cracking so as to represent cracks within the wall on which the device is mounted. Within the shell of the soccer ball in this exemplary embodiment, are lighting elements which allow the device to be used as a nightlight.

16 Claims, 2 Drawing Sheets

Related U.S. Application Data

(60) Provisional application No. 61/391,429, filed on Oct. 8, 2010.

(51) Int. Cl.
| | | |
|---|---|---|
| *B44C 1/10* | (2006.01) | |
| *B44C 5/00* | (2006.01) | |
| *F21S 8/00* | (2006.01) | |
| *A47B 81/06* | (2006.01) | |
| *A47B 96/02* | (2006.01) | |
| *A47G 29/00* | (2006.01) | |
| *F16M 13/02* | (2006.01) | |
| *A47B 97/00* | (2006.01) | |
| *F21W 121/00* | (2006.01) | |

(52) U.S. Cl.
CPC ............... *B44C 1/105* (2013.01); *B44C 5/00* (2013.01); *F16M 13/02* (2013.01); *F21S 8/033* (2013.01); *A47B 97/001* (2013.01); *F21W 2121/00* (2013.01)

(58) Field of Classification Search
USPC ..... 362/147, 190, 641, 806, 811; 472/69, 74
See application file for complete search history.

(56) References Cited

U.S. PATENT DOCUMENTS

| | | | | |
|---|---|---|---|---|
| 2,887,806 | A * | 5/1959 | Hassett | B32B 17/10045 156/250 |
| 3,220,130 | A * | 11/1965 | Falkenberg | G09F 13/00 248/688 |
| 3,393,310 | A * | 7/1968 | Ream | F21S 8/035 353/4 |
| 3,818,213 | A * | 6/1974 | Rochford | F21S 8/035 362/644 |
| D274,370 | S * | 6/1984 | Schwartz | D26/26 |
| 4,701,146 | A * | 10/1987 | Swenson | A63H 5/00 335/206 |
| 4,867,452 | A * | 9/1989 | Finley | A63B 43/06 40/327 |
| D310,129 | S * | 8/1990 | Archambault | D11/133 |
| 5,066,011 | A * | 11/1991 | Dykstra | A63B 43/00 362/809 |
| 5,236,383 | A * | 8/1993 | Connelly | A63B 43/007 446/219 |
| 5,277,952 | A * | 1/1994 | Watras | B28D 5/0029 428/46 |
| 5,495,402 | A * | 2/1996 | Houssian | F21S 8/035 362/186 |
| D388,832 | S | 1/1998 | Stiemert | |
| 5,947,581 | A * | 9/1999 | Schrimmer | A63H 27/10 362/189 |
| 6,022,128 | A * | 2/2000 | Chi | F21S 8/035 362/276 |
| 6,042,487 | A * | 3/2000 | Schrimmer | A63B 37/0003 473/353 |
| 6,117,504 | A * | 9/2000 | Yoshikawa | B44C 5/005 362/363 |
| 6,241,620 | B1 | 6/2001 | Santa Cruz et al. | |
| D451,048 | S * | 11/2001 | Adams | D11/133 |
| D457,462 | S * | 5/2002 | Allison | D11/125 |
| 6,416,204 | B1 * | 7/2002 | Cutshaw | B44C 3/12 362/326 |
| D471,508 | S * | 3/2003 | Schifrin | D12/400 |
| 6,666,782 | B1 * | 12/2003 | Wu | A63H 33/22 446/242 |
| 7,249,872 | B2 | 7/2007 | Ragsdale et al. | |
| 7,329,035 | B2 | 2/2008 | Feliciano | |
| 7,832,917 | B2 * | 11/2010 | Chien | F21S 8/035 362/641 |
| D658,542 | S * | 5/2012 | Eccles | D11/184 |
| 9,409,439 | B2 * | 8/2016 | Wegrzyn | B44C 1/105 |
| 2005/0259446 | A1 | 11/2005 | Smith et al. | |
| 2009/0213582 | A1 | 8/2009 | Thomas | |
| 2009/0214829 | A1 | 8/2009 | Chevallier | |
| 2010/0039762 | A1 | 2/2010 | Watson | |
| 2012/0160404 | A1 | 6/2012 | Chevallier | |
| 2014/0268883 | A1 | 9/2014 | Yang | |

FOREIGN PATENT DOCUMENTS

| | | |
|---|---|---|
| GB | 2322931 | 9/1998 |
| JP | S59-56097 U | 4/1984 |
| JP | S60-173398 U | 11/1985 |
| JP | H04-1185 U | 1/1992 |
| JP | H06-05700 U | 1/1994 |
| JP | 06-033184 | 4/1994 |
| JP | H07-04094 U | 1/1995 |
| JP | 2000-177300 A | 6/2000 |
| JP | 2004-354665 A | 12/2004 |
| JP | 2006-34321 | 2/2006 |
| JP | 2006-56000 A | 3/2006 |
| RU | 2178588 | 1/2002 |
| WO | WO 2010/044985 | 4/2010 |

OTHER PUBLICATIONS

Notification of the Examination Results (English translation) for Russian Patent Application No. 2013120541/12(030469); Explaining the relevance of RU 2178588; 3 pages; dated Oct. 2015.
Examination Report No. 1 for Australian Patent Application No. 2011313780; 3 pages; dated Jun. 13, 2014.
Third Office Action for Chinese Patent Application No. 201180048761.9; 12 pages; dated Oct. 23, 2015.
Notification of Reason(s) for Refusal for Japanese Patent Application No. 2013-532019; Explaining the relevance of JP S60-173398-U, JP 2000-177300-A, JP S59-56097-U, JP H04-11855-U, JP H07-4094-U and JP 2006-56000-A; 2 pages; dated Sep. 29, 2015.
Decision of Final Rejection for Japanese Patent Application No. 2013-532019; Explaining the relevance of JP S60-173398-U, JP 2000-177300-A, JP S59-56097-U, JP H06-05700-U, JP 200656000-A, JP H07-04094-U and JP 2004-354665; 6 pages; dated Feb. 16, 2016.
Office Action for Mexican Patent Application No. MX/a/2013/003928; 7 pages; dated Nov. 24, 2015.
Resolution of Notification of Expert Response (New Law) for Chilean Patent Application No. 2013-000946; 8 pages; dated Jul. 10, 2015.
Decision to Reject the Granting of a Patent (with English translation) for Russian Application No. 2013120541/12(030469); Explaining the relevance of RU 2178588; 6 pages; dated Feb. 2, 2016.
www.shutterstock.com item #29803501 and item #29804344, Broken Wall with Soccer or Football Stock vector 29803501: Shutterstock website, printed May 8, 2013.
First Office Action; CN Patent Application No. 201180048761.9; 6 pages; dated Sep. 29, 2014.
European Search Report for EP 11830164; 5 pages; dated Jun. 11, 2015.
Korean Intellectual Property Office's Notice of Preliminary Rejection dated Dec. 18, 2017 for Korean Patent Application No. Oct. 10-2013-7011835 (related to the present application) (English translation attached).

* cited by examiner

WALL MOUNTED, THREE DIMENSIONAL, VISUAL DISPLAY ELEMENT

CROSS REFERENCE TO RELATED APPLICATIONS

This application is a continuation of U.S. patent application Ser. No. 13/878,147, entitled "WALL MOUNTED, THREE DIMENSIONAL, VISUAL DISPLAY ELEMENT," which was the National Stage of International Application No. PCT/CA11/01139, filed Oct. 7, 2011, which claims the benefit of U.S. Provisional Application No. 61/391,429, filed Oct. 8, 2010, the entirety of each of these applications being incorporated by reference herein.

FIELD OF THE INVENTION

This invention relates generally to visual display items, and more particularly, to three dimensional, visual display elements which are adapted to be mounted to the surface of a wall.

BACKGROUND OF THE INVENTION

Various products are known for mounting onto the surface of a wall which provide distinctive visual elements. These include, for example, posters, prints, pictures and the like, but can also include products such as life-sized pictures of sports figures celebrities, fictional characters. However, unlike shelving units or the like, these visual elements are two dimensional, and typically lie flat on the wall.

Other two dimensional elements are known which provide a representation of three dimensional figures which appear to be coming out of the wall. As an example, Shutterstock Images (www.Shutterstock.com—Image No. 29804344) provides a print of a baseball surrounded by a "cracking" pattern which appears to be a baseball which has impacted, and cracked, the surface of a wall.

While this provides a distinctive visual appearance, it is merely a two dimensional image.

Light fixtures are known that project from a wall, but these do not include other visual elements.

Other products are known which simulate a three dimensional representation of a product coming through a glass window. Examples of these are half golf balls, or baseballs, adapted to be affixed to a glass surface, and which includes a cracked or crazed decal which provides a cracked appearance to the glass.

However, these products do not provide any real functional utility, and provide only a limited 2 or 3 dimensional visual element.

To overcome these difficulties, it would be advantageous to provide a three dimensional visual element suitable to be affixed to a wall surface, which provides an improved visual effect, while preferably also providing a functional utility.

SUMMARY OF THE INVENTION

One exemplary implementation of a three dimensional, visual display element of the present invention, is a portion of a sport ball, and preferably a half soccer ball which is adapted to be mounted onto the surface of a wall. The soccer ball representation is optionally, but preferably surrounded by a clear decal or other device such as a plate or disc, which is preferably affixed to the wall, and represents or simulates cracking or breaking of the wall in order to represent that the ball has impacted the wall, or is coming through or out of the wall.

In a further preferred feature of the present embodiment, the soccer ball (or other device) includes a light fixture, which can be turned on so as to provide lighting, or to act as a night light, or other lighting device. The light can be directly powered using a household power outlet, by use of battery power, or by use of a power adapter with an optional battery.

Where the device includes an electrical component, it is preferred that it also feature a controller that will automatically control the electrical component. As an example, for a night light function, these control features could include a light sensor to turn a night light on and off, timers to limit the time the night light is on, and the like.

A second exemplary implementation of a three dimensional, visual display element of the present invention, is a representation of a device or object (such as a car, or the like), an action figure, "superhero" or other fictional figure having a part, such as a body part, which at least partially extends away from the wall, and which can incorporate a shelving unit, at the end of an arm, for example. Other features might include a support for an electronic device such as a computer, computer monitor, radio, MP3 player, DVD or CD player, telephone, television, smoke detector, or the like.

In any case, the present invention provides a three dimensional, visual display element which can be mounted onto the surface of a wall, and which preferably includes a decal or other device that simulates cracking or breaking of the wall surface so as to create the appearance of a product crashing though, or impacting onto the wall.

Additionally, the present invention also provides a three dimensional, visual display element which preferably incorporates at least one functional feature, including, for example, a light, a shelf, hanger or hook, or which incorporates a product, or a support for a product, such as an electronic device, including, for example, a clock, phone, smart phone, PDA's, radio, speakers, music player including an MP3, tape or CD player, a computer device, such as a computerized gaming system, or an accessory therefor, a DVD player, a television, smoke detector, computer monitor, or the like. In this manner, the three dimensional, visual element not only provides a distinctive visual display, but also incorporates a (multi-)functional utility.

Accordingly, in a most preferred embodiment, the present invention provides a three dimensional, visual display element which comprises: (i) a visual element that is adapted to be mounted onto the surface of a wall; (ii) a decal or other device that simulates cracking or breaking of the wall surface; and (iii) additionally a functional device or feature.

DETAILED DESCRIPTION OF THE INVENTION

The visual element can be any suitable element that the user desires to display on the wall. Examples of the visual element can include sports equipment (e.g. baseballs, basketballs, soccer balls, hockey pucks, footballs, frisbees, or the like), nature themed products (e.g. rock outcroppings, tree limbs, or the like), sport figures, celebrities, fictional characters, and the like. The visual element preferably provides a representation of an actual device, but also can be an abstract visual element. The portion of the visual element that protrudes away from the wall is typically stationary, but might be moveable. For example, a fictional character's arm which protrudes from the wall, might be movable from one position to another.

The decal or other device for simulating cracking or breaking of the wall, can be a solid disc or plate, but more preferably is provided by a clear, flexible plastic film having a mild adhesive for temporary attachment to the wall, without causing damage to the wall itself, or any existing wall covering. The cracking or breaking design can be printed on to the disc, plate or flexible plastic film, and typically, the disc, plate or plastic film will be provided around the outside of the visual element.

For a round visual element (such as a soccer ball), the disc, plate or plastic film may have a generally circular shape, but for other visual elements, the shape and size of the disc, plate, or plastic film shape can change to match the shape and size of the visual elements.

Preferably, the visual element is "life sized" so as to be essentially the same size as the actual device. For example, a soccer ball light would preferably have a soccer ball shell which is the regulation size of a soccer ball.

The visual element can be manufactured from any suitable material depending on its intended use. These materials include wood, cardboard, paper, ceramics, metal or the like. Most preferably though, the visual elements are made from plastic materials which can be formed into the appropriate shape using any suitable technique. These techniques might include blow moulding, injection moulding, vacuum forming, or the like.

Combinations of various material might also be used, and the visual elements can be painted, or otherwise coloured in order to provide realistic visual representations. When used as a light or nightlight, plastics are particularly preferred, particularly when all or part of the plastic material of the element is translucent.

The visual element can be attached to the wall using any suitable devices, including glue or other adhesives, screws, bolts, nails, wire, or any other suitable devices or materials. The attachment devices can be essentially permanent devices, or can be temporary such as in the case of the attachment of a seasonal product (for example).

The functional feature is typically the incorporation of a light, to act as a light or nightlight, or a shelf or other holding device, such as a hook, hanger, basket, pocket, box or the like, or can incorporate various devices directly into the visual element itself, such as those electronic devices previously mentioned. In the case of a lighted product, the light can be any suitable light, including lights such as incandescent lights, fluorescent lights, compact fluorescent lights, LED lights or the like, which can be powered using household wiring, or through the use of replaceable or rechargeable batteries. The lighted product might also include multiple lighting elements, or may include multi-coloured light elements or features.

Where necessary, the function feature can include direct control of features such as volume, channel, displays, or power on/off functions, but remote control of any or all of these functional features using suitable wireless technologies might also be incorporated. Additionally, the functional feature or device can include other devices such as light or motion sensors, to control its functions.

The visual element is typically a standard image. However, the image might also be personalized for the particular user. This might include design elements from the user (e.g. the user's photographs), or information such as license plate numbers, for the like, or can include stickers or decals for the user to customize the visual elements. The stickers or decals might also be changeable to suit the user's wishes.

Further, while the present invention is preferable adapted to be attached to a wall, it might also be modified so as to be attached to a floor, or even more preferably, a ceiling of a room. Additionally, the device might also be attached to devices such as furniture such as doors, windows, desks, cabinets, dressers, tabletops, or the like.

Additionally, other secondary visual elements can be included to add to the impact of the first visual elements. For example foam bricks or boards might be included in the area around the first visual element, in order to enhance the impression of the device coming out of the wall.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
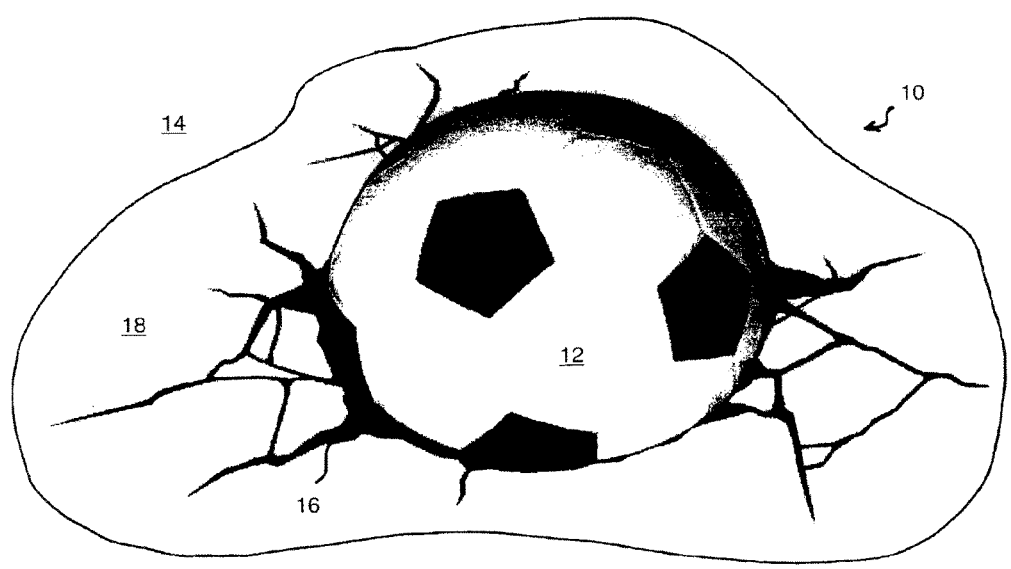
FIG. 1 is a perspective view of a soccer ball light showing a representation of one embodiment of the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Referring to FIG. 1 a soccer ball light 10 according to the present invention is shown. The soccer ball shell 12 is manufactured from a semi-circular, translucent plastic material. The soccer ball shell 12 is of regulation size for a soccer ball, and is coloured black and white so as to appear authentic. However, any suitable colour scheme or design might be used.

Soccer ball shell 12 is mounted onto wall 14, and around the perimeter of shell 12 is a decal 16 printed onto a clear, flexible, plastic film 18 which represents a series of cracks within the wall. In practice, decal 16 would preferably be applied to the wall first, and then shell 12 would be mounted approximately in the centre of film 18.

Figure 2:
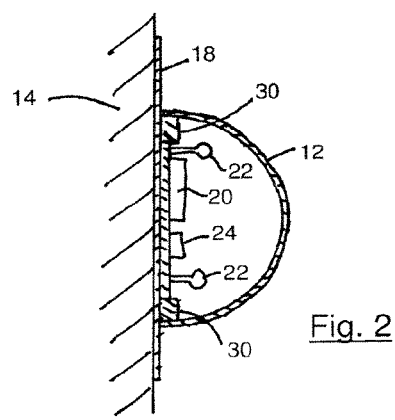
FIG. 2 is a cross-sectional view of the soccer ball light of FIG. 1, showing additional details.

In FIG. 2, it can be seen that shell 12 protrudes from wall 14, and is held onto wall 14 by attachment of ring 30. Housed within shell 12 is a battery 20 which is connected to a series of LED light elements 22. A wireless sensor switch 24 is provided which is operated by a remote control (not shown), or a motion sensor (not shown) so as to turn LED light elements 22 on or off, as desired. Sensor switch 24 also includes a timer element which automatically turns LED lights elements 22 off after a set period of time (e.g. 60 minutes).

A standard light switch might also be used in place of the wireless sensor switch.

Figure 3:
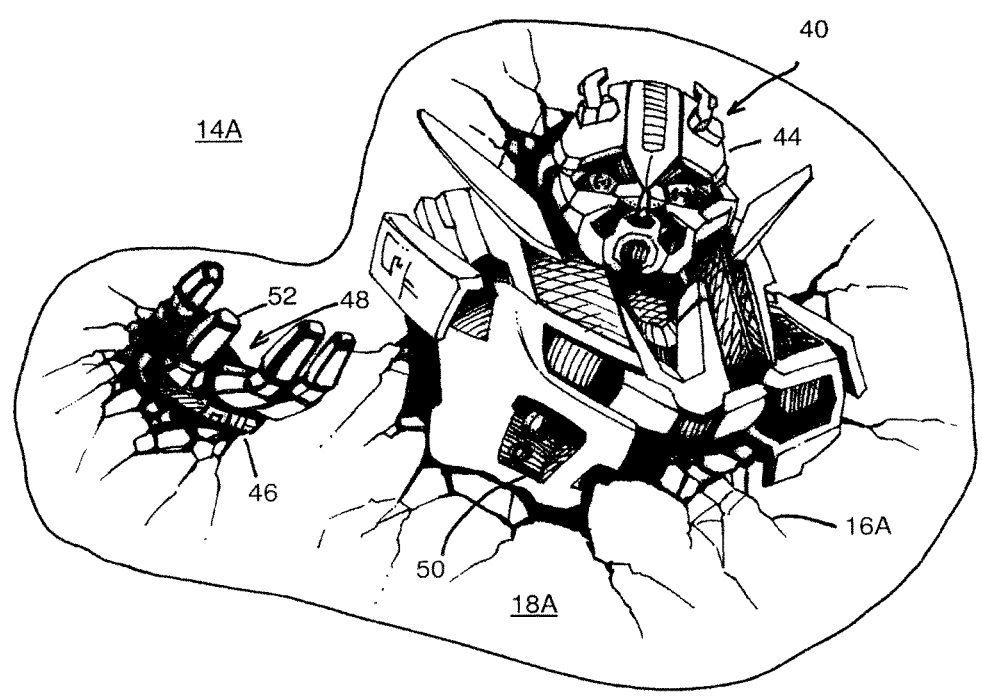
FIG. 3 is a perspective view of a fictional character representation, which includes a shelf and an electronic device.

In FIG. 3, a representation of a fictional character 40 is shown which includes portions of character 40 protruding from the wall 14, surrounded by decal 16A, on a film 18A, which decal shows cracks and breaks within wall 14. The head and upper torso 44 and one hand 46 of character 40 extend from wall 14. Located with the palm of hand 46 is a shelf 48 adapted to hold an MP3 player, and wiring is provided within arm 46 to connect it to a multi-functional clock, radio, MP3 player 50 located on head 44.

A finger 52 extends from hand 46, and can be used as a hook for hanging clothing or the like.

Around the outside of decal film 18A, other secondary visual elements in the nature of plastic brick representations might also be add to suggest that bricks have, or are, in the process of falling out of the wall.

Thus, it is apparent that there has been provided, in accordance with the present invention, a three dimensional visual display element, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Also, unless otherwise specifically noted, all of the features described herein may be combined with any of the above aspects, in any combination.

Moreover, the words "substantially" or "essentially", when used, with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A three dimensional lighting device, such lighting device comprising:
   a film affixable to a surface of a wall, the film having one or more images to simulate a background;
   a translucent shell forming a three dimensional image and configured to be mounted to the surface of the wall such that the translucent shell protrudes outward from the surface of the wall, and configured to be positioned so as to be surrounded by the film to represent that the translucent shell is emerging from the background; and
   a functional device or feature, including a light positioned within the translucent shell and configured to emit light visible from outside of the translucent shell.

2. The lighting device as claimed in claim 1 wherein said three dimensional image has the appearance of an action figure.

3. The lighting device as claimed in claim 1 wherein said three dimensional image has the appearance of superhero.

4. The lighting device as claimed in claim 1 wherein said three dimensional image has the appearance of at least a portion of a piece of sports equipment.

5. The lighting device as claimed in claim 1 wherein said three dimensional image has the appearance of at least a portion of a soccer ball, a basketball, a football, a baseball or a hockey puck.

6. The lighting device as claimed in claim 1 wherein said one or more images comprises a decal printed on the film.

7. The lighting device as claimed in claim 1 wherein said light is a night light.

8. The lighting device as claimed in claim 1 wherein at least part of the translucent shell is moveable from one position to another.

9. The lighting device as claimed in claim 1 wherein said three dimensional image simulates a device, and said translucent shell is sized so as to be essentially the same size as the simulated device.

10. The lighting device as claimed in claim 1 further comprising, in combination with said translucent shell, additional visual elements.

11. The lighting device as claimed in claim 1 wherein said background has the appearance of bricks or boards.

12. The lighting device as claimed in claim 1 further comprising a battery for powering said light.

13. The lighting device as claimed in claim 1 wherein said film is a clear, flexible plastic film having an adhesive for temporary attachment to a wall.

14. The lighting device as claimed in claim 13 wherein said plastic film is shaped and sized so as to match the shape and size of the translucent shell.

15. The lighting device as claimed in claim 1 wherein said translucent shell includes a mounting device for mounting said translucent shell to the surface of the wall with screws, bolts, or nails.

16. The lighting device as claimed in claim 15 wherein said translucent shell is configured to be mounted to the surface of the wall such that said film is positioned between said translucent shell and said surface of the wall.

* * * * *